Dec. 22, 1970 R. C. MARSHALL 3,548,560

AUTOMATIC CHECK BANDER

Original Filed Feb. 2, 1967 12 Sheets-Sheet 1

INVENTOR.
RICHARD C. MARSHALL
BY
Fishburn & Gold
ATTORNEYS

INVENTOR.
RICHARD C. MARSHALL
BY
Fishburn & Gold
ATTORNEYS

Dec. 22, 1970 R. C. MARSHALL 3,548,560

AUTOMATIC CHECK BANDER

Original Filed Feb. 2, 1967 12 Sheets-Sheet 3

INVENTOR.
RICHARD C. MARSHALL

BY Fishburn & Gold

ATTORNEYS

INVENTOR.
RICHARD C. MARSHALL

BY
Fishburn & Gold
ATTORNEYS

INVENTOR.
RICHARD C. MARSHALL

BY

Fishburn & Gold

ATTORNEYS

AUTOMATIC CHECK BANDER

Original Filed Feb. 2, 1967 12 Sheets-Sheet 6

INVENTOR.
RICHARD C. MARSHALL
BY
Fishburn & Gold
ATTORNEYS

Dec. 22, 1970 R. C. MARSHALL 3,548,560

AUTOMATIC CHECK BANDER

Original Filed Feb. 2, 1967 12 Sheets-Sheet 7

INVENTOR.
RICHARD C. MARSHALL

BY Fishburn & Gold

ATTORNEYS

INVENTOR.
RICHARD C. MARSHALL
BY
Fishburn & Gold
ATTORNEYS

INVENTOR.
RICHARD C. MARSHALL
BY
Fishburn Gold
ATTORNEYS

INVENTOR.
RICHARD C. MARSHALL
BY
Fishburn & Gold
ATTORNEYS

INVENTOR.
RICHARD C. MARSHALL
BY
Fishburn Gold
ATTORNEYS

AUTOMATIC CHECK BANDER

INVENTOR.
RICHARD C. MARSHALL
BY
Fishburn & Gold
ATTORNEYS

3,548,560
AUTOMATIC CHECK BANDER

Richard C. Marshall, Kansas City, Mo., assignor to Automatic Bander Corporation, Kansas City, Mo., a corporation of Missouri Continuation of application Ser. No. 613,615, Feb. 2, 1967. This application Mar. 28, 1969, Ser. No. 832,525
Int. Cl. B65b 13/20
U.S. Cl. 53—3 28 Claims

ABSTRACT OF THE DISCLOSURE

An apparatus for banding of a plurality of articles such as checks into packets including a frame with a pair of opposed spaced retaining members rotatably mounted thereon and adapted to hold a pack of items to be banded. The apparatus includes a band housing structure for containing a plurality of elongate bands with a mobile carriage movable from the band housing to the pack position and having vacuum and air means for separating bands in the housing and removing one for depositing the band in the packed position transversely thereof, and with the pack in position, the pack can band or be clamped by retaining means and the assembly then rotated to wrap the band around the pack, and upon completion of the rotation, the retaining means are released from the pack for removal of the pack from the apparatus. Said apparatus including pressure controls for the retaining means with operation of all of the steps being in time sequence whereby a stack of items is placed in the packed position and after the operation a fully banded pack is removed.

This is a continuation of Ser. No. 613,615, filed Feb. 2, 1967, now abandoned.

This invention relates to the banding of various materials such as checks, currency and similar articles into packets and more particularly, to a new and improved apparatus for the automatic banding of such materal.

Heretofore, various banding devices have been developed and utilized in manufacturing facilities such as devices for the banding of envelopes into packets in association with envelope manufacturing processes wherein a multitude of packets are formed and banded in assembly line type fashion employing methods and apparatus of such a nature that their adaptation to commercial facilities such as banks and the like where tremendous quantities of currency, checks and other commercial papers are banded on a daily and even hourly basis is impractical. In such establishments as these, materials of this nature are banded through manual processes employing very simple mechanisms which serve only to compress the packet prior to a manual banding or wrapping of the band about the compressed packet thereby providing an extremely slow process consuming large quantities of man hours to complete a relatively simple operation.

The principal objects of this invention are: to alleviate the aforementioned difficulties in the art by providing a new and improved banding apparatus wherein individual packets of materials such as checks, currency or similar articles may be rapidly and efficiently banded together to form a packet; to provide such an apparatus of such a nature that its utilization in banks and other commercial establishments is quite practical and will result in considerable savings in time and expense; to provide such an apparatus wherein an individual stack of material may be placed into the apparatus and quite rapidly banded and ejected or removed from the apparatus with the apparatus automatically prepared for receipt of a following pack of material; to provide such an apparatus including a wrapping assembly and a band feeding assembly wherein bands are individually and automatically placed in the band wrapping assembly, a pack of material received in said wrapping assembly relative to said band and said band automatically wrapped about said pack of material, said apparatus having a continuous operation with all steps of said operation being executed in timed sequence such that an operator need only place a stack of material in the wrapping assembly and extract therefrom a fully banded packet in a very short time interval.

This invention contemplates a band wrapping assembly comprised of a means rotatably mounted to a frame for holding a pack of material and a longitudinal band, said band being disposed adjacent one of the surfaces of said pack. The band wrapping assembly further includes a means operatively connected to said holding means for rotating said holding means about an axis generally transverse to said longitudinal band and a follower means operatively associated with said holding means for directing the band into encompassing relation about said pack as the pack is being rotated in said holding means. It is further contemplated that said band may employ a self-adhering adhesive on its opposed end portions such that when said follower means presses said end portions of said band together during the rotation of said holding means, said portions will be adhered together thereby placing the band in adhered encompassing relation about said pack of material.

This invention further contemplates a fully automatic band feeding assembly operatively associated with said wrapping assembly for supplying bands to said wrapping assembly in timed sequence with the operation of said wrapping assembly. The band feeding assembly contemplates a band storage or supply means and means for extracting an individual band from said supply means and moving said band to a predetermined position on the holding means of said band wrapping assembly, said band moving means being operated in timed sequence with the band wrapping assembly.

Other objects and advantages of this invention will become apparent from the following description taken in connection with the accompanying drawings wherein are set forth by way of illustration and example certain embodiments of this invention.

Figure 9:
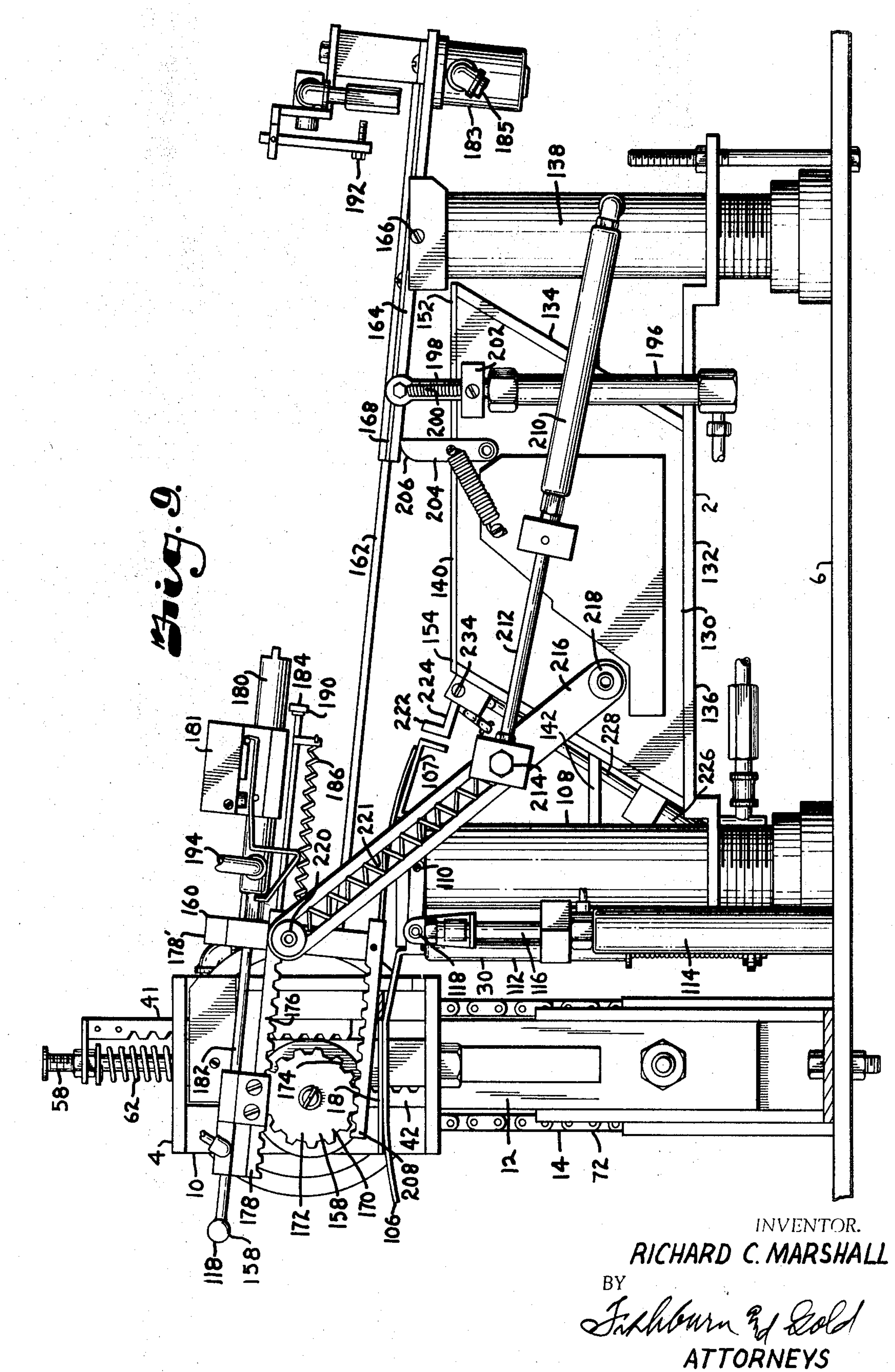

FIG. 9 is a side elevational view with the carriage assembly of the band supply assembly fully extended forwardly into position betwen the retaining plates of the holding means of the band wrapping assembly where the vacuum is released from said vacuum wheel thereby releasing the band in a desired predetermined position on the base or lower plate of the holding means and a follower arm of a follower assembly.

Figure 10:
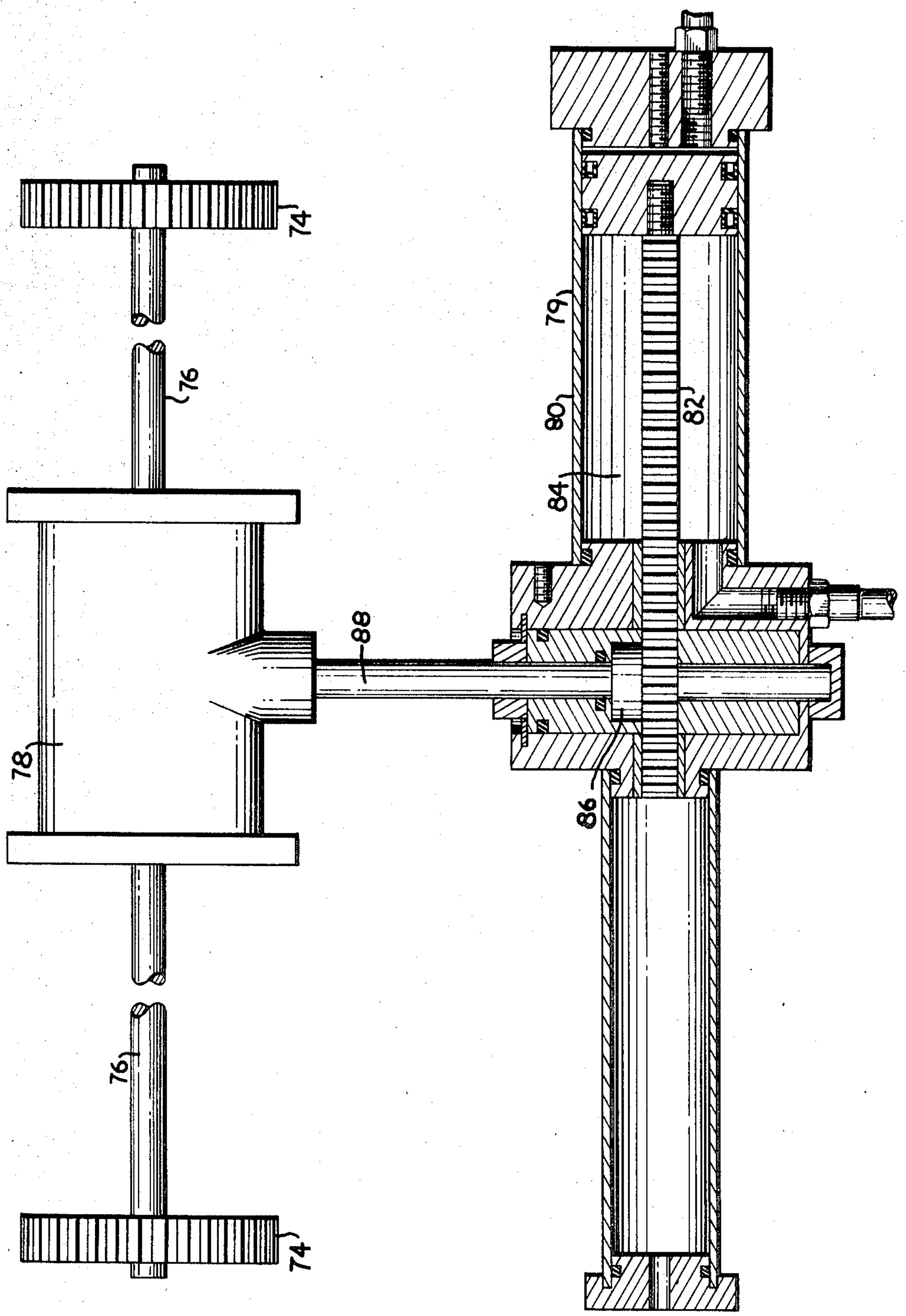

FIG. 10 is a partial, vertical, sectional view of a portion of a rotary actuator for rotating the packet and band holding means of the band wrapping assembly including a pneumatically actuated rack and pinion mechanism for driving a pair of opposed sprocket wheels to effect a 360 degree rotation of the packet and band holding means.

Figure 11:
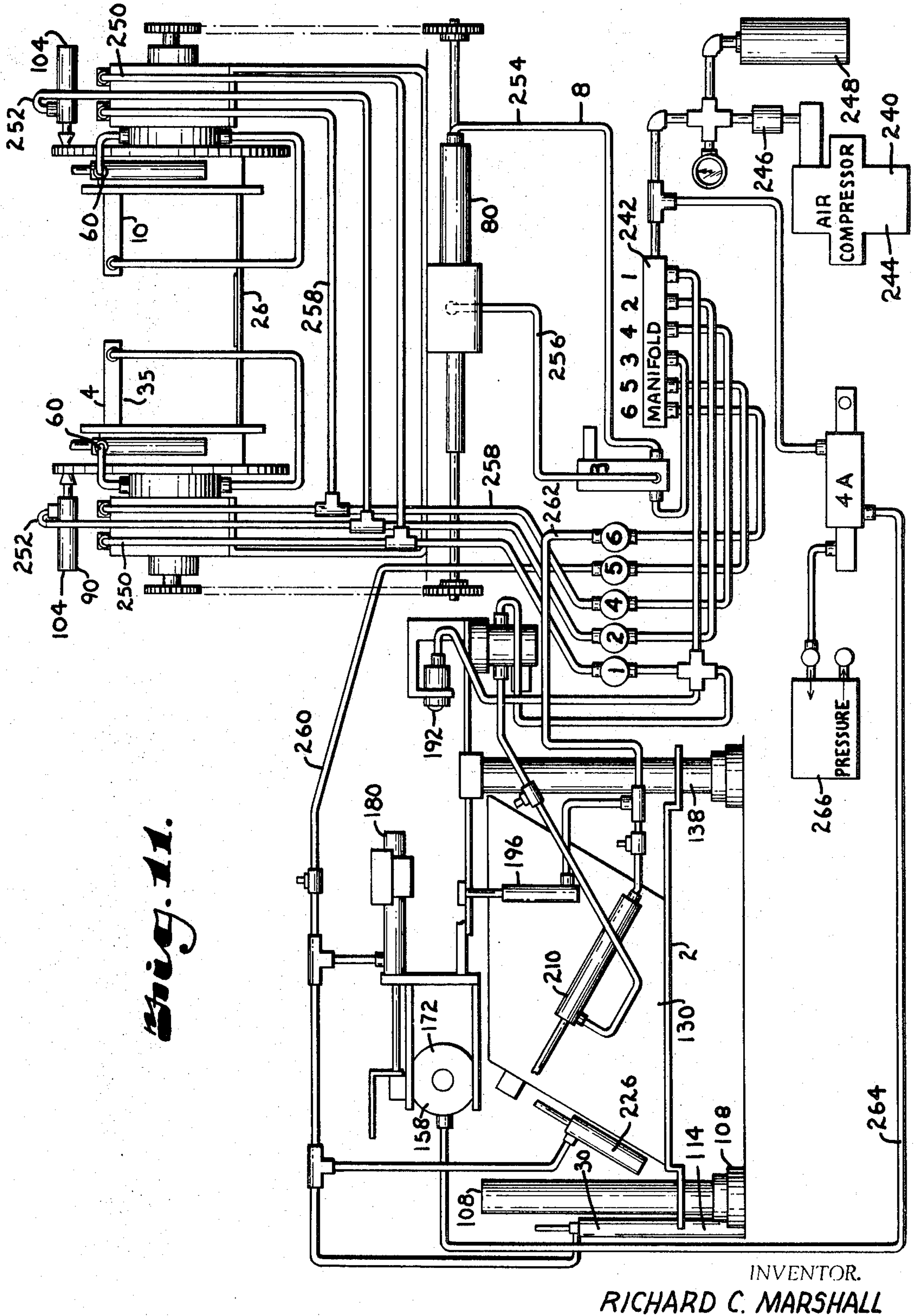

FIG. 11 is a diagrammatic view of the pneumatic system for operating the band supply assembly and the band wrapping assembly in timed sequence.

Figure 12:
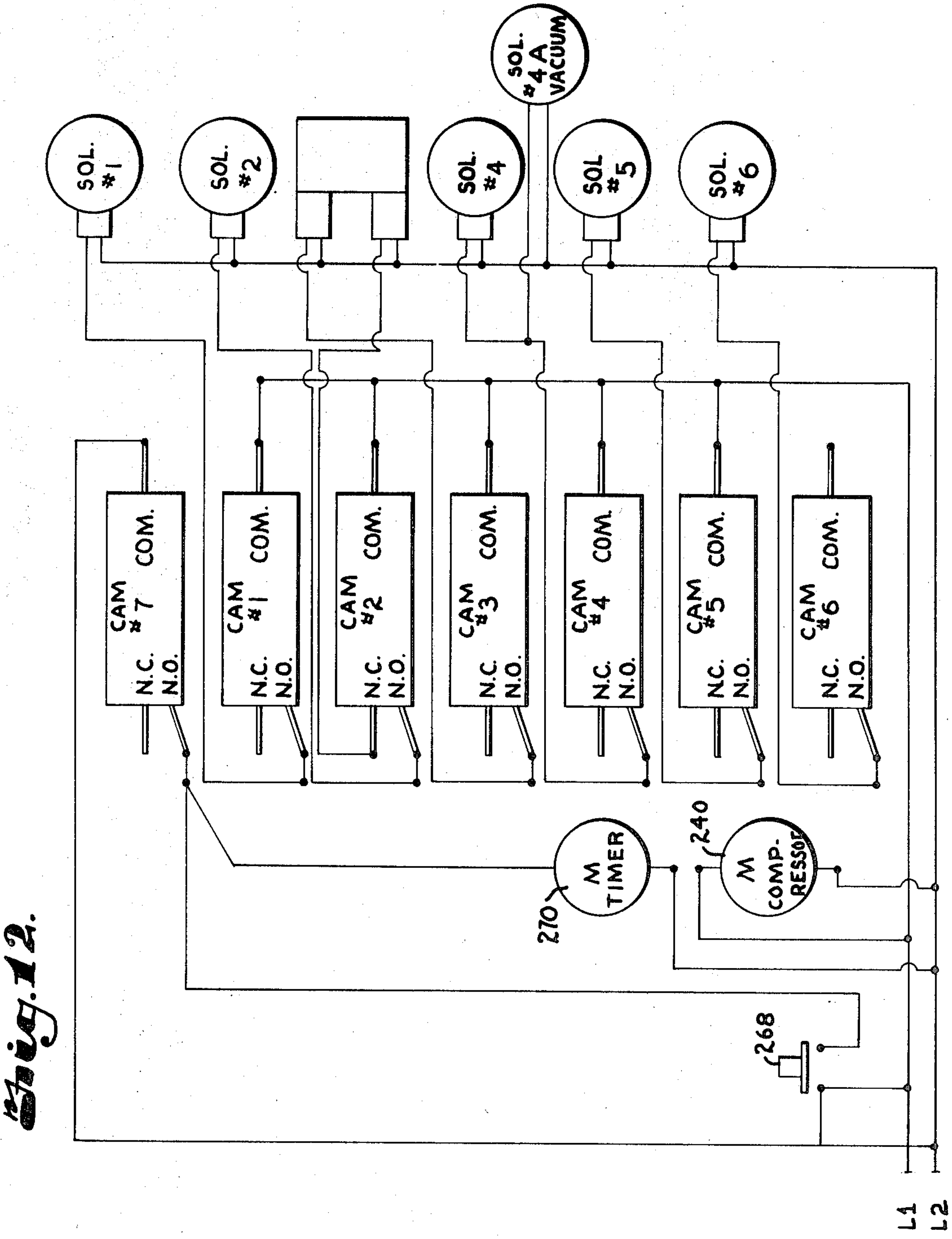

FIG. 12 is a schematic view of the electrical circuits employed for operation of the banding apparatus in a plurality of timed sequential steps.

Figures 4, 13, 14:
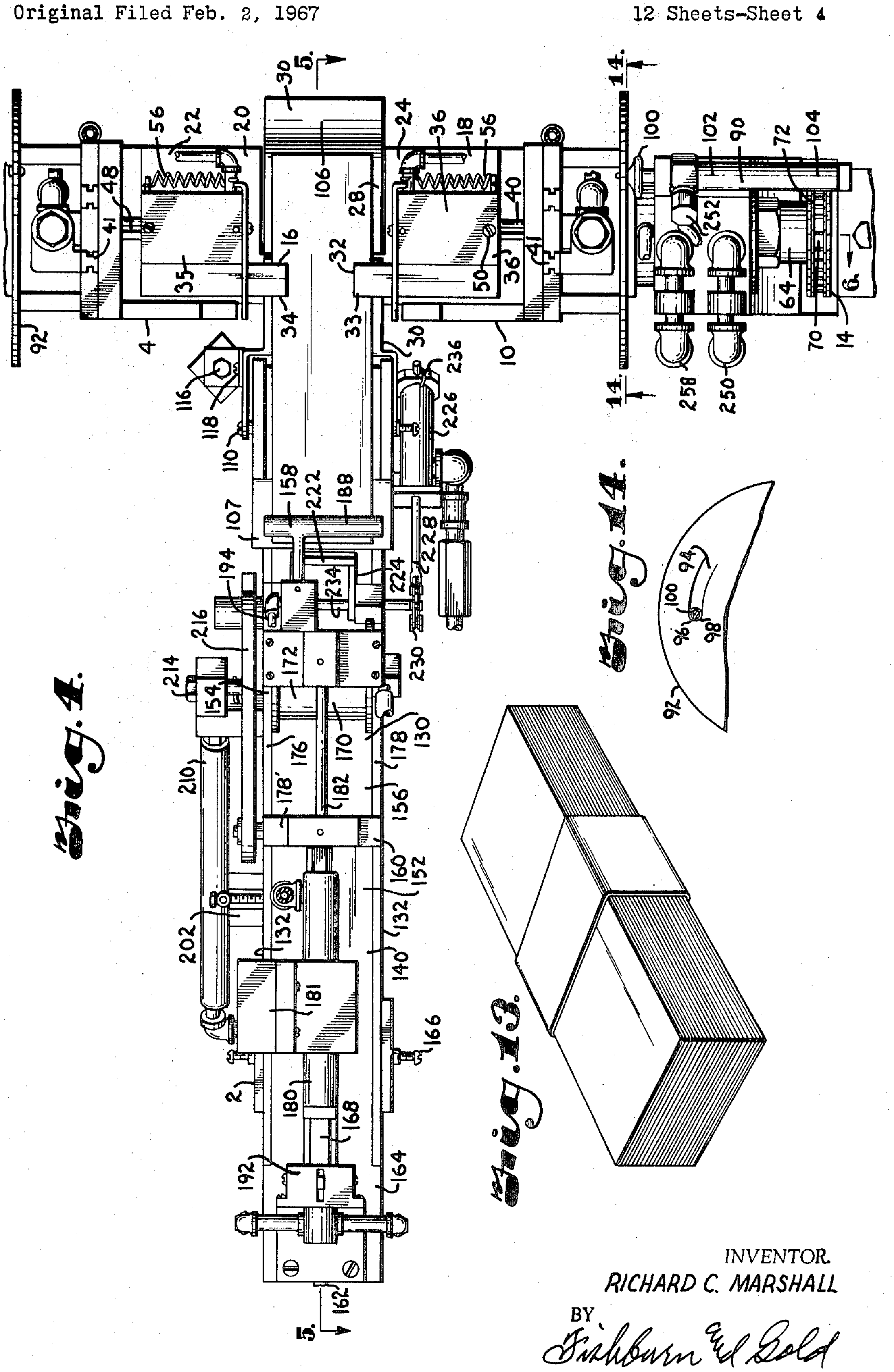
FIG. 4 is a top plan view of the banding apparatus illustrated in FIG. 1.
Figure 5:
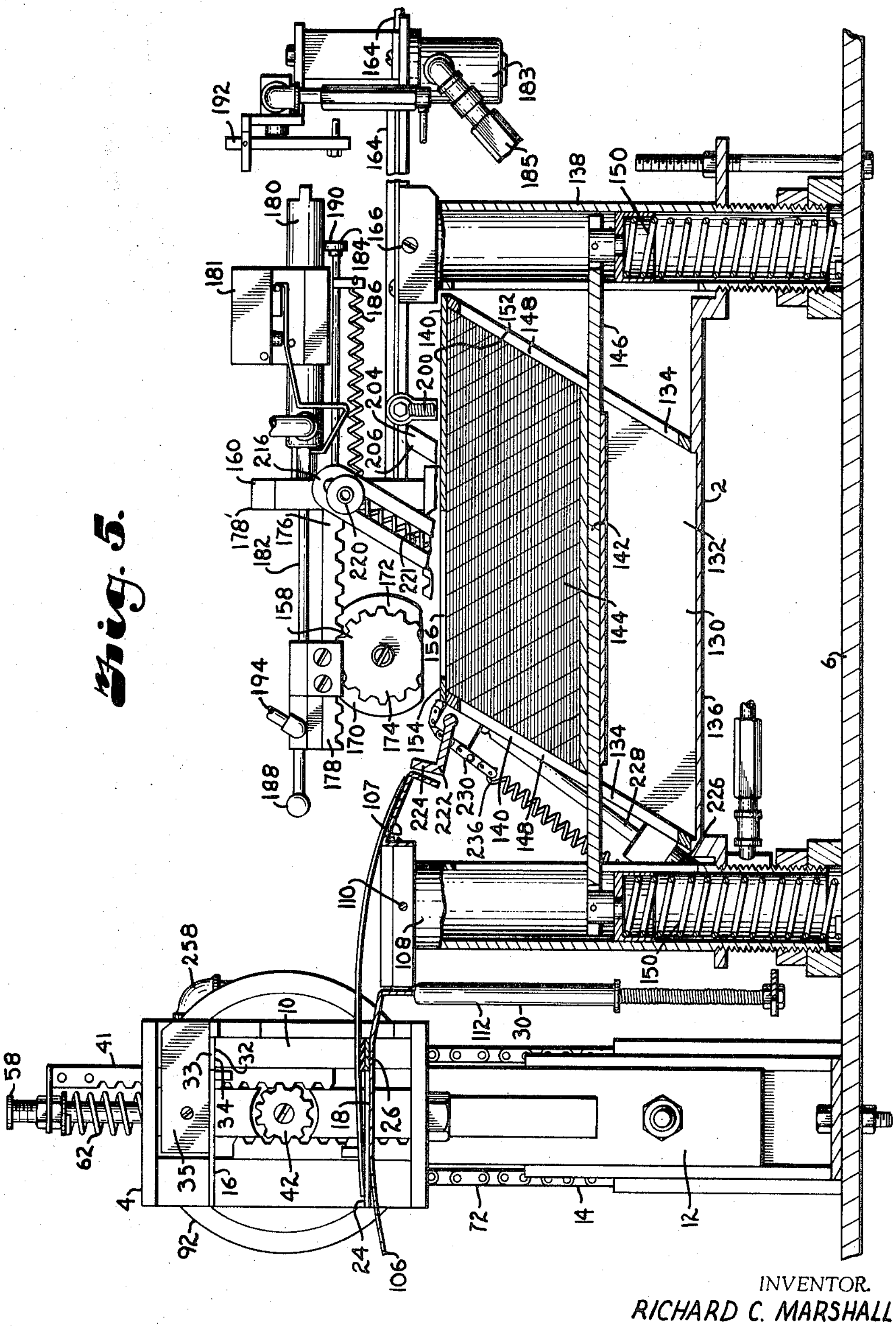
FIG. 5 is a vertical, longitudinal, sectional view taken on line 5—5 of FIG. 4 through the banding apparatus showing the interior of the band storage housing and its spring biased lower partition and an interior elevational view of one side of the band wrapping assembly.

FIG. 13 is a perspective view of a banded pack of material such as checks or similar articles.

FIG. 14 is a fragmentary vertical sectional view through the nylon tip of the momentum control showing a groove and abutment means on the annular member of the holding assembly.

Referring to the drawings in more detail:

The reference numeral 1 broadly designates a banding apparatus embodying the features of this invention and being comprised of a band feeding assembly 2 and a band wrapping assembly 4, each operatively mounted on a supporting frame 6 with said assemblies 2 and 4 being operatively associated for cooperative action in the banding of packs of material such as currency, checks or similar articles. The wrapping assembly 4 and the band feeding assembly 2 are each operatively connected to a pneumatic driving system suitably arranged and having suitable components for effecting the various operations of each of the assemblies 2 and 4 in timed sequential steps to provide an efficient banding operation.

The band wrapping assembly 4 includes a cradle or material pack holding or retaining assembly 10 rotatably mounted to the frame 6 on a pair of vertical support frame members 12 and operatively driven in a rotatable manner about a transverse axis by a chain drive system 14. The pack and band holding assembly 10 includes a pair of spaced, opposed retainers 16 and 18 interconnected by a driving assembly for effecting relative movement between said retainers 16 and 18 to engage opposed surfaces of the material pack in clamping engagement to retain said pack in a desired relative position to a longitudinal band, said band having opposed end portions and having one end portion disposed adjacent one of the clamped surfaces of said pack between said retainer and said pack and transversely to the axis of rotation of the holding assembly 10.

The retainer 16 is comprised of a base plate 20 for receiving the longitudinal band thereon and the material pack in overlying relation to said band. The base plate 20 includes a pair of opposed plate portions 22 and 24 connected along their rearward edge portiton by a central strip 26, such that said portions 22 and 24 and said strip 26 have edge portions defining a centrally located notch or recessed area 28 in which a band follower assembly 30 is disposed for maintaining the band in contacting relation to the material pack as said holding assembly is being rotated by the driving system 14. In the illustrated embodiment, the band is disposed in overlying relation to the central strip 26 and the follower assembly 30 with the material pack being disposed in overlying relation to the band, the follower assembly 30, the strip 26 and the opposed portions 22 and 24 and the base plate 20.

The retainer 18 is comprised of a pair of horizontally opposed, pressure plate assemblies 32, each for clamping engagement with the upper surface of the material pack to retain said pack between said base plate 20 and said pressure plate assemblies 32. The pressure plate assemblies 32 are each movable transversely of the longtiudinal band horizontally toward one another to a central position before clamping engagement with the material pack and are movable in a reverse manner outwardly from the central position upon completion of the banding operation.

The pressure plate assemblies 32 are each comprised of a frame 33, a pressure plate 34 and a pressure cylinder 35 illustrated as a block 36 carried by said frame 33, said block 36 defining a bore 38. The frame 33 includes a tubular supporting member 40 which is operatively connected to one rack member 41 of a double rack and gear drive system 42 and is slidably received in the bore 38 and serves to support the block 36 and plate 34 carried by said block 36. The tubular member 40 as illustrated, has a slidable piston member 44 received therein and connected to the block 36 by the bolt 50 said bolt 50 being reciprocally movable through a slot 48 in the upper side of the tubular member 40. A pressure conduit 46 is operatively connected to the tubular member 40 to provide pressure to a pressure chamber 49 defined by the tubular member 40 forward of the piston 44 for driving the piston toward the double rack system 42 to separate the pressure plates 34 of the assemblies 32 in a horizontal manner. The forward or outward movement of the plate 34 and block 36 to a central position is restricted or stopped at the desired position by the abutment of the bolt 50 against an end edge 52 of the slot 48. When the pressure plates 34 are in central position their end portions 54 are each disposed in overlying opposed relation to the central strip 26 of the base plate 20 whereby said end portion 54 and said strip 26 are employed for clamping the longitudinal band between said strip 26 and the pack of material thereby holding the longitudinal band in a desired relative position adjacent one of the side surfaces of the pack of material. It should be noted that upon the band wrapping operation the band is wrapped over the opposed end portions 54 of the pressure plates 34 rather than in contacting relation with the upper surface of the pack of material. The pressure plates 34 then disengage themselves from between the wrapped band and the pack of material by providing pressure to the chamber 49 to drive the blocks 36 and plates 34 outwardly from one another sliding the end portions 54 from beneath the band. The plate 20 and the plates 34 are then vertically displaced and a return spring 56 employed to return the blocks 36 and plates 34 to their central position, said spring having one end portion connected to the frame 33 at the conduit 46 connection and the opposed end to the block 36. The flow of the pressure medium to and from the chamber 49 as illustrated, is effected in timed sequence with the flow of fluid pressure to the means for activating the double rack and gear system 42 employed for moving the base plate 20 and the pressure plates 34 to clamping relation with the material pack, the pressure flow being effected through the drive system 8.

Figure 3:
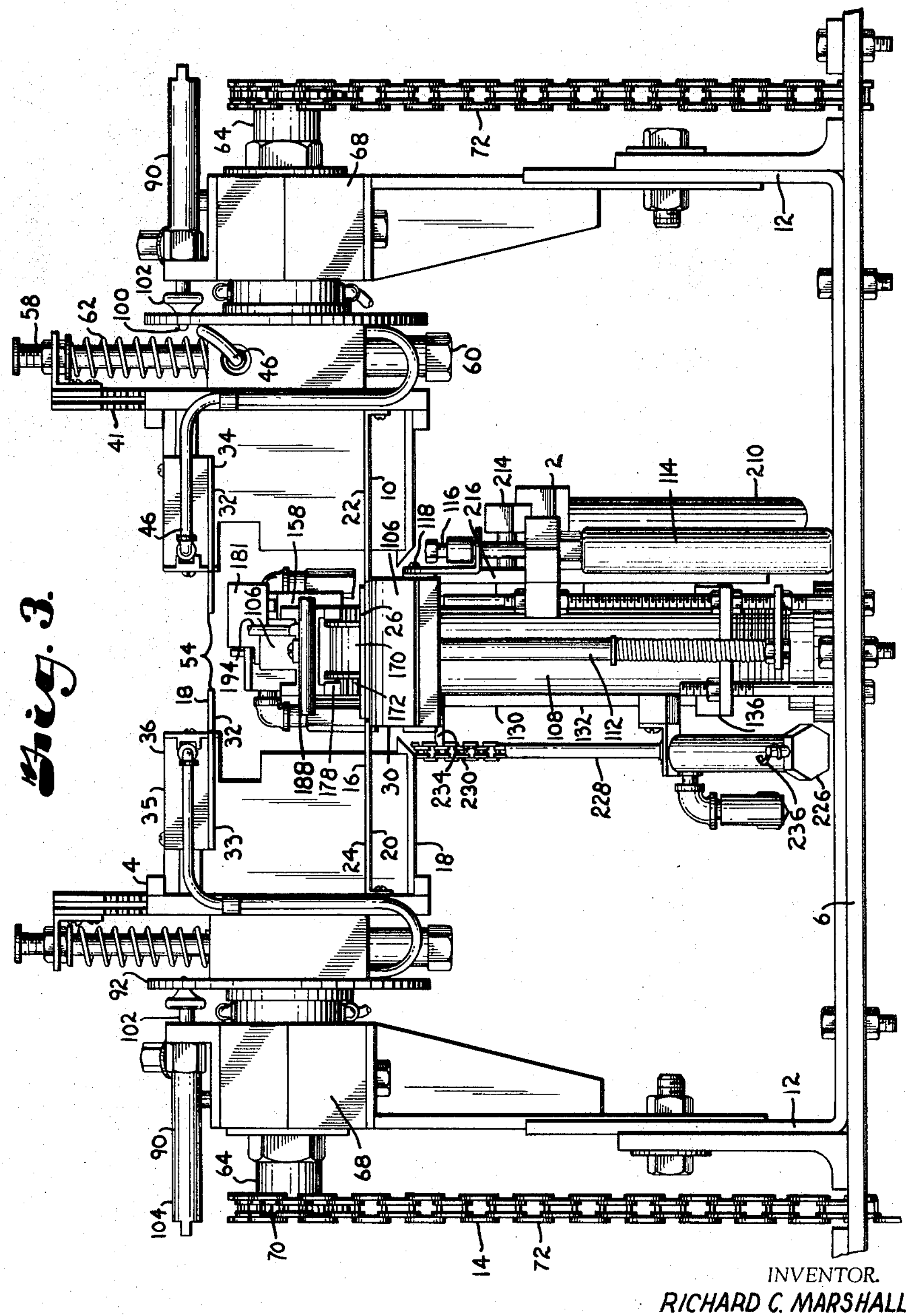
FIG. 3 is a front elevational view of the banding apparatus illustrated in FIG. 1.
Figure 6:
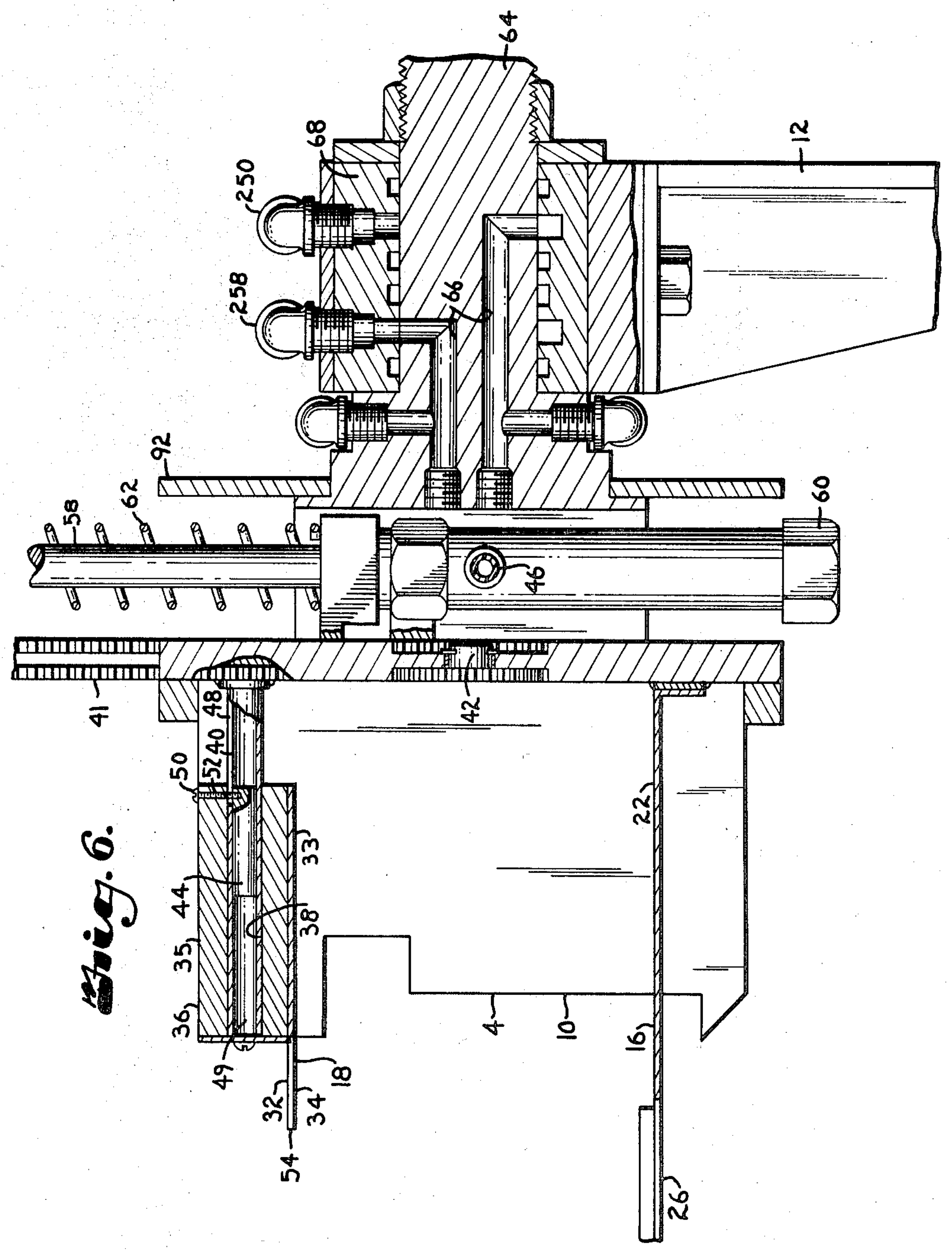
FIG. 6 is a vertical transverse sectional view taken on line 6—6 of FIG. 4 through one side of the band wrapping assembly showing one side portion of the packet holding means with its pressure responsive upper retaining plate, lower base plate and the drive system for effecting relative movement between the upper and lower plates of the holding means.
Figure 7:
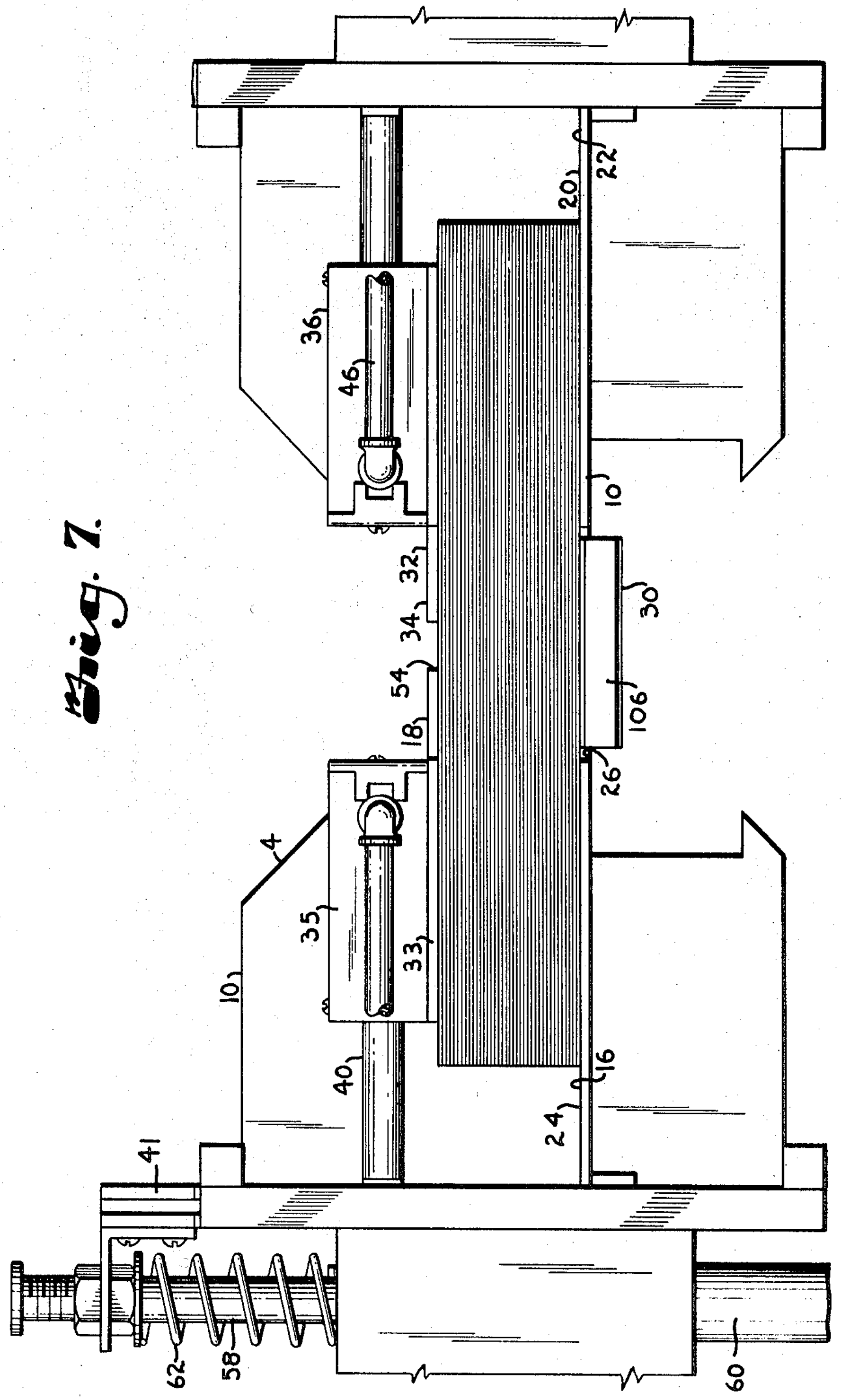
FIG. 7 is a front elevational view illustrating the holding means with a band and pack of material disposed between the spaced retaining plates of said holding means.

The double rack and gear system 42 is operatively connected to the driving piston 58 of a pneumatic vertical cylinder 60 with a spring return 62 operatively connected thereto, whereby the flow of air to the cylinder 60 effects a downward movement of the piston 58 causing the double rack and gear system 42 to be actuated thereby pulling the base plate 20 and pressure plates 34 into clamping relation with the longitudinal band and material pack. The air pressure system to the cylinder 60 being operatively connected through a pressure relief valve whereby only a predetermined pressure is applied to the material pack and band with said valve activating a switch for cutting off the flow of pressure through the cylinder 60. As the pressure medium is supplied to the cylinder 60, it is also supplied through the conduit 46 operatively connected to the cylinder 60 as illustrated in FIG. 3 to the pressure chamber 38 for driving the pressure plates 34 to their central position. In a timed manner through the drive system 8, the pressure of the cylinder 60 is released, allowing the spring return means 62 to drive the piston 58 outwardly of the cylinder 60 to return the base plate 20 to the pressure plates 34 to a first widely spaced, inactive position to allow the removal of the banded pack of material from the holding assembly 10. The holding assembly 10, as illustrated in FIG. 6, has a pair of rotatable spindles 64 at its opposed rotatable connections to the frame members 12, each of said spindles 64 having pressure medium flow conduits 66 defined therein for effecting the flow of a pressure medium such as air through the drive system 8 and into the cylinder 60. The drive system 8 is operatively connected to the mounting portion 68 of the frame member 12 which receives the rotatable spindles 64 of the holding assembly 10 to effectively supply the fluid pressure through the ducts 66 to the cylinder 60.

Each of the opposed rotatable spindles 64 has a sprocket wheel 70 operatively connected thereto for driving engagement with a chain drive 72 with said chain drive 72 being operatively engaged with a pair of opposed sprocket wheels 74 illustrated in FIG. 10. The sprocket wheel 74 is driven on shafts 76 through a gear box 78 by a rotary actuator 79 having a pneumatic cylinder 80. The pneumatic cylinder 80 includes a rack 82 operatively connected thereto in lieu of a driving piston whereby the flow of a fluid medium to a chamber 84 effects a longitudinal movement of a rack 82 for engagement with a gear 86 on a vertical shaft 88 which in turn rotates the opposed shafts 76 through the gear box 78. The rotary actuator is activated in a timed sequential manner through the drive system 8 to thereby provide a 360 degree rotation of the holding assembly 10 through the chain drive system 14.

In order to insure the completion of exactly 360 degrees of rotation of the holding assembly 10, momentum control or releasable stop means 90 is provided for engaging the holding mechanism 10 in a releasable manner to halt the rotation at a desired predetermined point. In the illustrated embodiment, an annular member 92 is operatively mounted to each of the rotatable spindles 64 for rotation therewith and defines an inwardly inclined groove 94 terminating at its rearward end portion in a through aperture 96 forming an abutment surface 98 at said rearward end of the groove 94, against which a nylon tip 100 of a spring biased stop member 102 abuts to stop the rotation of the annular member 92 and thereby the rotation of the holding assembly 10 at a desired position. The stop member 102 as illustrated is a spring biased pneumatic cylinder piston operatively connected to a cylinder 104 and releasable from said abutment by activation of said cylinder 104 in a timed manner through the drive system 8 to permit the rotation of the holding assembly 10 to wrap a longitudinal band about the material pack.

The band wrapping assembly 4 also includes a follower assembly 30 against which the band may bear in sliding engagement therewith as the holding assembly 10 is being rotated to effectively retain the band in close relation to the material pack and also to press opposed portions of the longitudinal band together as the holding assembly 10 is being rotated to cause adherence between respective portions of self-adhering adhesive to effectively adhere together the opposed ends of the longitudinal band to thereby retain the band in wrapped relation about the pack of material. In the illustrated embodiment, the follower assembly includes a tongue or follower arm 106 swingably mounted to a supporting member 108 by means of a pivot pin 110 and being swingable about said pivot pin 110 by a spring assembly 112 to force the follower arm 106 upwardly and a pneumatic cylinder 114 having its piston arm 116 pivotally connected at 118 to the follower arm for pulling the follower arm 106 downwardly and away from the material pack and longitudinal band. The pneumatic cylinder 114 is operatively connected within the drive system 8 for activation in timed sequence with the other steps of the band wrapping operation.

The spring mechanism 112 forces the arm 106 upwardly into springing engagement with the band and the material pack to maintain the band against the pack as the pack is being rotated in the holding assembly 10 and to force together the opposed ends of the longitudinal band to effect adhesion between opposed portions of said band, having said self-adhesive thereon. As the follower arm 106 will move upwardly as the double rack assembly 42 activates the base plate 20 to raise said base plate 20 and said follower arm 106 will remain in this position upon completion of the rotation of the holding assembly 10, the cylinder 114 is employed to draw the arm 106 downwardly at the same time as the lowering of the base plate 20 such that the force of the spring mechanism 112 is not applied on the double rack assembly 42 through the base plate 20.

The band feeding assembly 2, being operatively mounted to the supporting frame 6, includes a band housing or magazine 130 having side and end walls 132 and 134 respectively with a bottom wall 136 operatively connected to a pair of opposed support members 108 and 138 with a partial top wall or partition 140. Within the housing 130, a movable inner partition 142 is operatively mounted, for maintaining an upward force or bias on the supply of bands 144 retained in said housing 130, said partition 142 being spring biased whereby said pressure is maintained on said band even though the supply diminishes within the housing 130. The partition 142 has a pair of end portions 146 extending outwardly through a pair of aligned slots 148 in the opposed end walls 134 with said end portions 146 being operatively connected to a spring means 150 disposed in each of the tubular support members 108 and 138 for forcing the partition 142 in an upward direction to thereby maintain a pressure on the supply of bands 144 in the housing 130.

The upper wall or partition 140 of the housing 130 has a first portion 152 overlying one of the opposed ends of said longitudinal band and a second portion 154 overlying the opposed end portion of said bands and said portions 152 and 154 defining therebetween an opening 156 wherein the upper surface of the uppermost longitudinal band and the supply of bands 144 is exposed for removal from the housing 130 for feeding through the band wrapping assembly 4.

A band delivery assembly 158, operatively carried on a mobile carriage member 160, is employed for engaging the uppermost band in the stack of bands 144 in the housing 130 and moving said band from said housing 130 to a desired predetermined position on the base plate 20 and the follower arm 106 of the band wrapping assembly 4. The mobile carriage 160 includes a guide member 162 slidably received in a guide frame 164, said frame being swingably mounted in the illustrated embodiment to the support member 138 by a pin connection 166. As illustrated in FIG. 9, the guide frame 164 is inclined or pivoted about pin 166 when the mobile carriage 160 is moved to a forward position above the follower arm 106 of the follower assembly 30 for disposition of the longitudinal band on the base plate 20 and the follower arm 106. The guide 162 is suitably received in a slideway 168 in the guide frame 164 and may be suitably keyed to be retained in sliding relation with said slideway 168 to maintain the position of the guide 162 with the guide frame 164.

The mobile carriage 160 includes a vacuum wheel assembly 170 for engaging the uppermost longitudinal band in the stack of bands 144 and carrying said band to a forward position in the band wrapping assembly 4. The vacuum wheel assembly 170 includes a vacuum cylinder 172 having a vacuum port therein for drawing a vacuum therethrough in a conventional manner, the apparatus for drawing said vacuum being operatively connected within the power drive system 8 for operation in timed sequence with the other mechanisms of the banding apparatus 1.

The vacuum wheel 172 as illustrated in FIG. 3 has a pair of gear wheels 174 mounted on opposed sides thereof for engagement with a double rack assembly 176 operatively connected to the mobile carriage 160 for rolling the cylinder 172 in a rearward direction after drawing the vacuum through the port of said cylinder 172 to engage the uppermost longitudinal band to the vacuum port. The rearward rolling action of the cylinder 172 causes the uppermost longitudinal band to be lifted up and out from the housing 130 through the aperture 156 in the upper wall 140 and to separate from the other longitudinal bands in the stack 144. The rearward rolling action of the cylinder 172 is effected by driving the upper rack members 178 rearwardly through activation of a pneumatic cylinder 180 which has a driving piston 182 operatively connected to the upper rack members 178. The rack members 178 have a rearwardly extending shaft 184. A framework 178' suitably connects said members 178 and has a spring return means 186 operatively connected thereto and to the frame of the carriage 160 for returning the upper rack members 178 to a forward position upon release of the pressure in the cylinder 180. The cylinder 180 is operatively connected within the power drive system 8 for operation in timed sequence with the remainder of the mechanisms in the apparatus 1.

Figure 8:
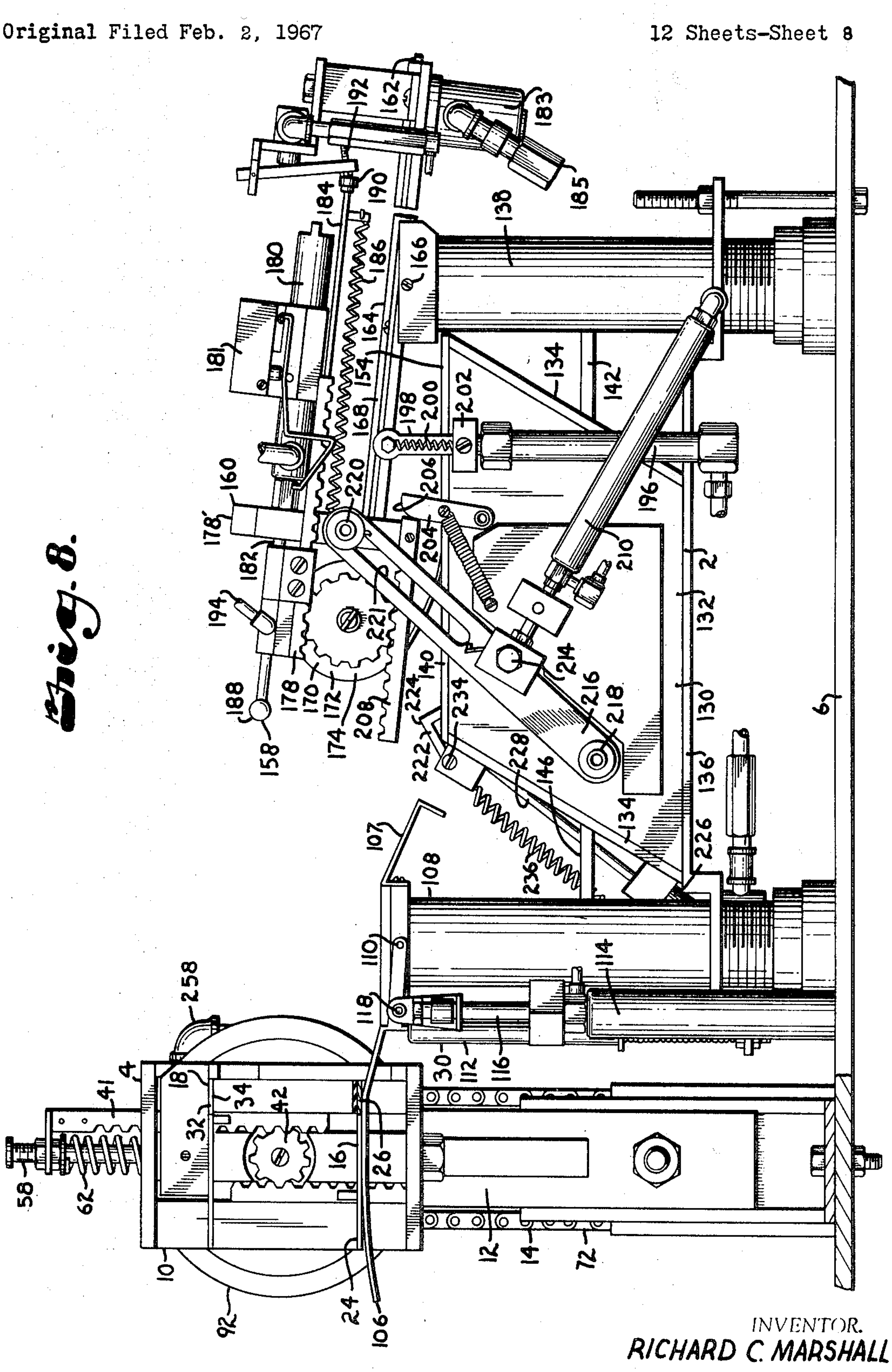
FIG. 8 is a side elevational view of the apparatus shown in FIG. 1 with the carriage assembly of the band supply assembly in an inclined position and having the vacuum wheel of said carriage assembly retracted with a band adhered thereto and pulled up from the next adjacent band in the band supply housing.

The carriage assembly 160 also includes an air jet mechanism 188 operatively connected to the carriage and having means therein for directing a jet of air against the forward end portion of the band when said band is rolled upon the vacuum cylinder 172 by the rearward rolling action of the cylinder 172. Referring to FIG. 8, as the upper rack member 178 is moved to a rearward position, the shaft member 184 operatively connected thereto has a head portion 190 which engages a ball valve mechanism 192 for allowing a jet of air to pass through a conduit 194 to the air jet mechanism 188 for application against the end portion of the longitudinal band to separate from said band any additional bands which may have become adhered for various reasons to the uppermost band. As the carriage assembly 160 is moved forwardly toward the banding assembly 4, the head 190 comes out of contact with the valve mechanism 192 causing the air flow to cease to the air jet mechanism 188.

As the upper rack members 178 are moved rearwardly to move the vacuum cylinder 172 in a rearward direction, a cylinder 196 having its piston arm 198 operatively connected to the guide frame 164 is activated for elevating the forward end of the guide frame 164 to incline the carriage assembly 160. This action properly inclines the carriage assembly 160 for its forward movement to a desired position above the base plate 20 and follower arm 106 of the band wrapping assembly 4. A release of pressure on the cylinder 196 causes a spring return means 200 connected to the driving piston 198 and a frame member 202 to exert a downward force on the guide frame 164 to return the piston to an inactive position.

Figure 1:
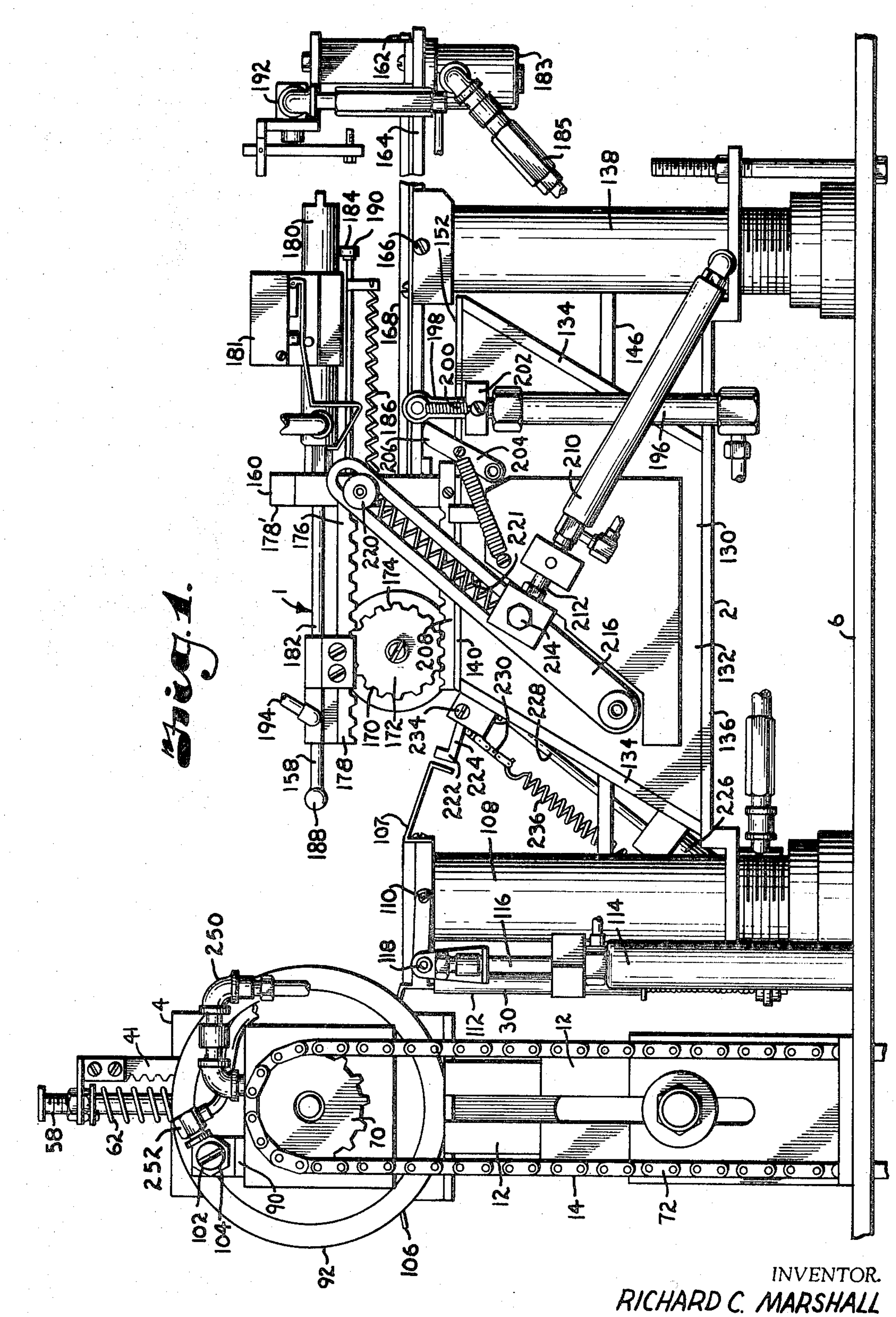
FIG. 1 is a side elevational view of a banding apparatus embodying the features of this invention.

As the cylinder 196 is activated driving the piston arm 200 upwardly a spring biased support member 204 swingably connected to the housing 130 is moved into an upstanding position to effectively support the guide frame 164 in its inclined position as illustrated in FIG. 9. The forward upper surface 206 of the support member 204 is beveled such that a return of the carriage assembly 160 to its rearward position as illustrated in FIG. 1 causes the lowermost rack member 208 of the rack assembly 176 to engage the support member 204 forcing it rearwardly and out of supporting relation to the frame 164 allowing the frame 164 to assume a horizontal position.

The carriage assembly 160 is driven to a forward position above the follower arm 106 and the base plate 20 of the band wrapping assembly 4 by means of a pneumatic cylinder 210 which has a driving piston 212 pivotally mounted at 214 to a swingable arm 216 swingably connected at 218 and 220 to the housing 130 and the carriage assembly 160 respectively. The connection at 220 also being slidable within a slot 221 defined in the swingable arm 216 as a pivot pin 220 extends through said slot 221 having an enlarged head portion, said pin being attached to a spring means also secured to said arm to cushion the relative movement of said arm 216 and said pin 220. As the driving piston 212 is moved outwardly of the cylinder 210, the carriage assembly 160 moves forwardly as guided by the guide member 162 sliding in the guide frame 164 to a position in the band wrapping assembly 4, said carriage assembly 160 being supported in its forward position by the swinging arm 216 mounted to the housing 130. The cylinder 210 like the other cylinders in the combination being operatively connected in the system 8 to provide activation of said cylinder 210 in timed sequence through the remainder of the mechanisms in the apparatus 1. The cylinder 210 is operatively connected in system 8 to effect a positive pressure on the piston arm 216 both inwardly and outwardly to move the carriage assembly 160 to and from the wrapping assembly 4. The cylinder maintains a pressure on the piston 216 upon return of the carriage assembly to the housing 130 to provide a positive downward pressure of the cylinder 172 on the stack of bands 144 in the housing 130 to insure the gripping of the uppermost band by the cylinder 172 when a vacuum is created therein.

When the upper members 178 of the rack assembly are moved rearwardly, one of said members 178 engages a microswitch 181 which is operatively coupled to a solenoid valve 183. The solenoid valve 183 is operatively connected in an exhaust line 185 from the piston return side of the cylinder 210. The solenoid 183 is actuated to release pressure from said cylinder 210 through line 185 to relieve the downward force of the vacuum cylinder 172 on the stack of bands 144 in the magazine 130 effected through the arm 216. This release of pressure then allows the cylinder 196 to incline the guide frame 164 for positioning of the carriage assembly 160.

Figure 2:
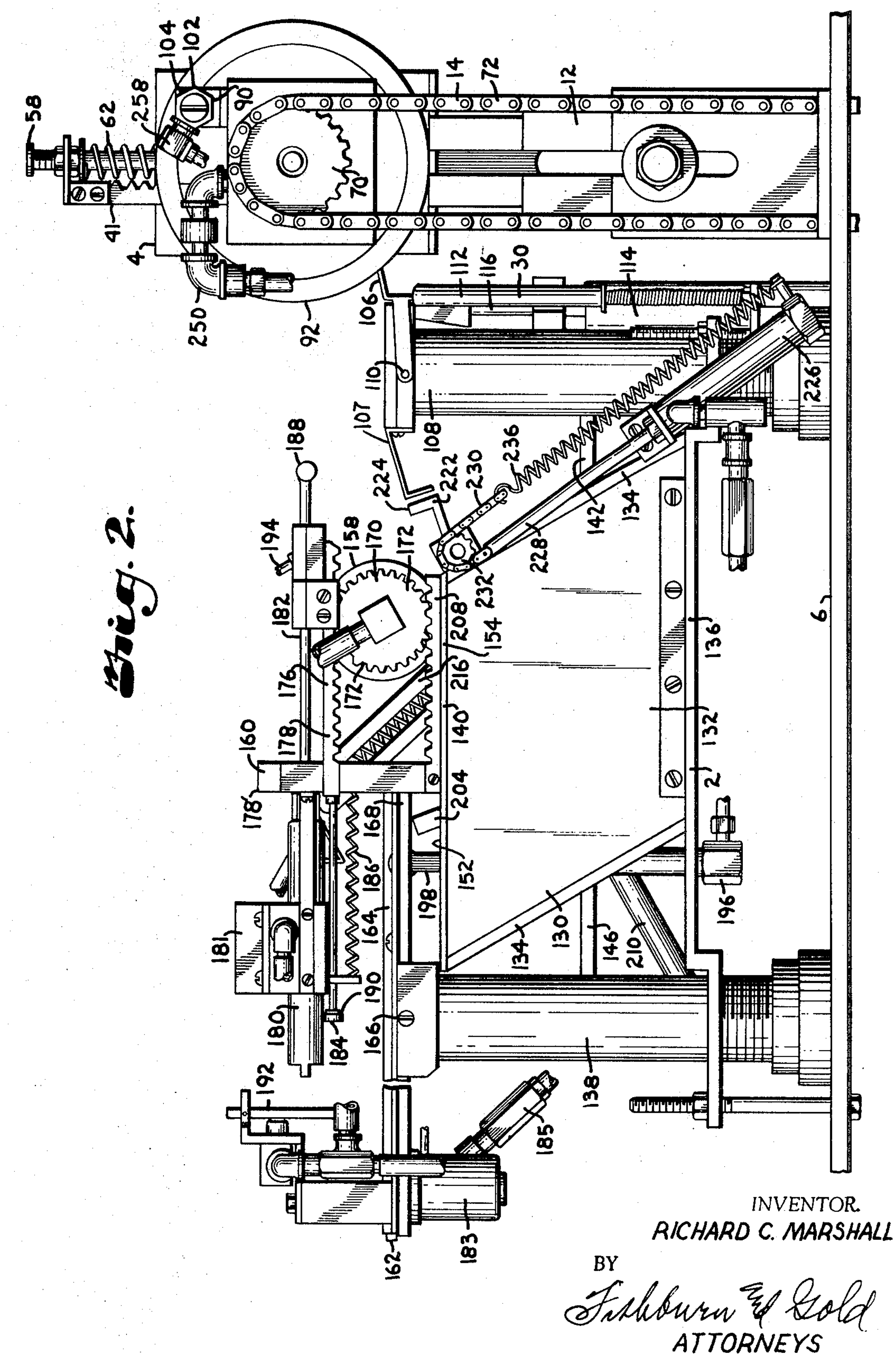
FIG. 2 is a side elevational view of the banding apparatus illustrated in FIG. 1 and showing the side opposite that shown in FIG. 1.

A jogger assembly 222 is operatively connected to the housing 130 having a swingable jogger arm 224 which is swingable rearwardly into contacting relation with the stack of bands 144 in the housing 130 when the cylinder 172 is rolled to its rearward position. The jogger is employed to eliminate static electricity which tends to bond the various individual bands within the stack 144 together, making their separation difficult when engaged by the cylinder 172. The jogger arm 224 is activated by a cylinder 226 illustrated in FIG. 2, having a driving piston arm 228 operatively connected to a chain 230 engaging a sprocket wheel 232 on a shaft 234 on which the jogger arm 224 is operatively mounted. The chain 230 has its opposed end portion connected to a return spring 236 operatively mounted to the frame 8 in a suitable manner for returning the jogger arm to an inactive position upon release of pressure to the driving piston 228, whereby swinging the jogger arm forwardly to an inactive position where no conflict will exist between the jogger arm 224 and the forward movement of the mobile carriage 160 to the band wrapping assembly 4.

The power drive system 8 employs an air compressing system 240 for supplying air pressure to a manifold 242 with said system 240 having an air compressor 244 of a conventional nature operatively connected through a filter 246 to an air supply tank 248 and the manifold 242. The manifold 242 is then operatively coupled through respective solenoid valves to the various components of the apparatus 1 as illustrated in FIG. 11. Each of the individual solenoid valves themselves actuated, by means of a conventional cam system having a plurality of cam switches as illustrated in FIG. 12, to selectively activate the individual solenoid valves in timed sequence to effect the timed sequential steps of operation of the various components of the apparatus 1.

Referring to FIG. 11, the solenoid 1, a three way valve, normally closed, is operatively connected to the pressure supply line 250 connecting the pressure manifold 242 to the vertical cylinders 60 employed for bringing the opposed retaining plates 16 and 18 of the holding assembly 10 in the clamping relation with the longitudinal band and the material pack.

The solenoid 2, which is a normally closed three way valve, is operatively connected in a supply line 252 connecting the manifold 242 to the momentum control cylinders 104 employed for limiting the rotation of the respective sides of the band and pack holding assembly 10.

The solenoid 3 is a four way valve in a normally closed position and is employed for operatively connecting the manifold 242 to the rotary actuator 80 for rotating the holding assembly 10 through a supply line 254 having a return line 256 from the actuator 79.

The solenoid valve 4 which is a three way, normally closed valve, is operatively connected in a supply line 258 to the rotatable mounting 68 for the rotatable spindles 64 of the holding assembly 10 for connection to the conduit 46 for providing pressure to the chamber 49 to effect a horizontal relative movement between the opposed pressure plate assemblies 34 and to the cylinder 114 of the follower assembly 30 to lower the follower arm 106.

The solenoid valve 5 is operatively connected in a supply line 260 connecting the manifold 242 to the cylinder 180 which is operatively connected to the upper rack member 178 for rearwardly rolling the vacuum cylinder 172 and to the cylinder 226 of the jogger assembly 222.

The solenoid valve 6 is operatively connected in a supply line 262 to the vertical cylinder 196 employed for elevating the guide frame 164 of the band feed assembly 2 and also to the cylinder 210 employed for driving the mobile carriage assembly 160 forwardly to the band wrapping assembly 4.

The solenoid valve 4*a* is employed for control of the vacuum drawn through the vacuum cylinder 172 being operatively connected in a line 264 coupling the vacuum cylinder 172 to a vacuum motor 266 such as a Gast vacuum motor.

Referring to FIG. 12, a push button 268 is employed for completing the circuit between lines L–1 and L–2 for activation of the motor of the timer 270 which is operatively connected to cam 7 which controls the commencement and termination of the complete cycle of the banding apparatus 1, shutting off the apparatus when the banding operation has been completed. The individual cams 1 through 6 are then rotated for activation of the individual camming switches for throwing the respective solenoid valves 1 through 6 respectively, with cam 4 actuating solenoid 4*a*, to control the sequential steps of operation of the apparatus 1.

In operation the apparatus 1 initially has a longitudinal band disposed transversely to the axis of rotation of the holding assembly 10 and in overlying contacting relation to the follower arm 106 and the central strip 26 of the base plate 20 and extending rearwardly therefrom in overlying relation to the support 108 and a support plate 107. A pack of material such as currency, checks or similar articles, are then laid in overlying contacting relation to the longitudinal band extending generally transversely thereto and in overlying contacting relation to the opposed portions 22 and 24 of the base plate 20. With the pack of material disposed in this position, the push button 268 is then depressed to complete the circuit through lines L–1 and L–2 to the timer motor 270 for rotating the individual cams 1 through 6.

Initially the cam 1 opens the solenoid valve 1 providing pressure to the vertical cylinders 60 actuating the double rack assembly 42 for drawing together the opposed base plate 20 and pressure plate assemblies 32 for clamping engagement of the longitudinal band and the material pack. The cam 2 then opens the solenoid valve 2 to provide pressure to the momentum control cylinders 104 for wtihdrawing the stop member 98 from the abutment surface 96 to allow rotation of the holding assembly 10. The cam 3 then opens the solenoid valve 3 allowing pressure to the rotary actuator 79 to rotate the cradle or holding assembly 10 about an axis transverse to the longitudinal band. Following the opening of the solenoid valve 3, the solenoid valve 2 is closed such that the spring return of the momentum control assembly 90 biases the nylon tip 100 of the stop member 98 against the annular member 92 such that the stop member 98 will engage the abutment surface 96 on the annular member 92 to stop the rotation of the holding assembly 10 after closure of the solenoid valve 3 or in other words, to limit the momentum of the holding assembly 10 whereby the holding assembly 10 will be stopped in a desired predetermined position.

As the holding assembly 10 is being rotated, the follower arm 106 on which the longitudinal band is disposed is spring biased upwardly against the band and pack to press the band against the pack during the rotation and to press together the opposed ends of the band as the rotation is being completed in order to force together opposed portions of said band having self-sealing adhesive thereon to effect a sealing of the band about the pack of material. During the wrapping operation of the band about the pack, the band is wrapped over and around the central end portions 54 of the pressure plates 34 such that the pressure plate portions 54 are disposed between the band and the pack of material. Upon completion of the rotary movement of the holding apparatus 10, the cam 4 opens the solenoid valve 4 to provide pressure to the pressure plate assemblies 32 for driving the pressure plates from their central position between the longitudinal band and the pack of material. The cam 1 then closes the solenoid valve 1 to release or exhaust the pressure from the vertical cylinders 60 causing the spring returns 62 to actuate the rack assembly 42 for separating the pressure plate assemblies 32 and the base plate 20 from clamping engagement with the banded material. The cam 4 then closes valve 4 allowing an exhaustion of pressure from chamber 49 and the spring return 56 to return the plates 34 to a central position. The material, now fully banded, is lying on the base plate 20 and may be removed manually or may be ejected by the forward driving action of the vacuum cylinder 172 as a new longitudinal band is delivered for disposition on the base plate 20 and the follower arm 106.

The carriage assembly 160 which is disposed in overlying relation to the housing 130 places the vacuum cylinder 172 in abutting relation to the uppermost longitudinal band in the stack of bands 144 within the housing 130. The cam 4 actuates a solenoid 4*a* providing a vacuum through the vacuum port on the vacuum cylinder 172 to engage the uppermost longitudinal band in the stack 144 for retention of said band for feeding to the band wrapping assembly 4. The cam 5 then opens the solenoid valve 5 for providing pressure to cylinder 180 of the carriage assembly 160 for actuation of the upper rack member 178 to roll the cylinder 172 rearwardly in the carriage 160 to lift the forward end of the uppermost longitudinal band through the opening 156 in the upper wall 140 of the housing 140 and roll said end upwardly around the vacuum cylinder 172. The opening of the solenoid valve 5 also provides pressure to the jogger assembly cylinder 226 for activation of the jogger arm 224 to swing said arm into contacting relation with the stack of bands 144 to eliminate static electricity in said stack 144.

As the upper rack member 178 is being pulled rearwardly by the cylinder 180, it engages the microswitch 181 operatively connected to the solenoid valve 183 causing said valve 183 to open for exhausting an existing pressure to the piston return side of the cylinder 210 which is employed for driving the carriage assembly 160 to and from the band wrapping assembly 4. The driving cylinder 210 maintains a downward pressure on the driving arm 216 when the carriage assembly 160 is returned to its position overlying the uppermost band in the stack of bands 144. This downward pressure maintains a positive force of the cylinder 172 against or in abutting relation to the uppermost band of the stack 144 to insure a gripping action between the vacuum drawn through the port of the vacuum cylinder 172 and said uppermost band. As the upper rack member 178 is drawn rearwardly by the cylinder 180 the rearwardly extending rod portion 184 of the upper rack member 178 strikes the ball valve 192 for issuing a jet of air pressure through a supply line 270 to the air jet mechanism 188 for blowing excess bands away from the uppermost band adhered to the vacuum port of the vacuum cylinder 172.

The cam 6 then opens the normally closed solenoid valve 6 providing air pressure to the cylinder 196 for elevating the forward end portion of the guide frame 164 to properly direct or orient the mobile carriage 160 for its movement to the band wrapping assembly 4. The opening of the solenoid valve 6 also allows the flow of pressure to the piston driving side of the driving cylinder 210 for swinging the driving arm 216 forwardly, as illustrated in FIG. 9, to position the mobile carriage 160 above the follower arm 106 and the base plate 20 of the band wrapping assembly 4.

As the mobile carriage assembly 160 is being pushed forwardly the air pressure to the cylinder 180 is exhausted, causing the spring return means 186 to drive the upper rack member 178 forwardly to roll the cylinder 172 in a forward direction to the position as illustrated in FIG. 9. The forward rolling action of the cylinder 172 along with the forward driving force of the mobile carriage 160 as it is moved into position in the band wrapping assembly 4, will eject a previously wrapped pack of material from the base plate 20 as the forward portion of the vacuum cylinder 172 strikes the pack of wrapped material.

As the upper members 178 of the rack assembly 176 moves forwardly, it releases its pressure on the microswitch 181, causing the solenoid valve 183 to be opened to provide pressure to the opposite side of the cylinder 210 for withdrawing the driving piston 212 to swingably rotate the driving arm 216 rearwardly to reposition the carriage assembly 160 in overlying relation to the band housing 130. At the same time the solenoid 6 closes, allowing the forward driving side of the cylinder 210 to be exhausted for pulling the cylinder 212 rearwardly into the cylinder 210, with the carriage assembly 160 positioned in overlying contacting relation to the uppermost band of the stack of bands 144 the pressure forcing the return of the piston 212 is maintained on the arm 216 to hold the cylinder 172 downwardly against the uppermost band of the stack of bands 144.

When the mobile carriage assembly 160 is disposed in overlying relation to the base plate 20 the solenoid valve 4*a* is activated for shutting off vacuum to the vacuum cylinder 172 to thereby release the longitudinal band from the cylinder 172, allowing it to fall onto the follower arm 106 central portion 26 of the base plate 20 and extending rearwardly over the support 108 and the support plate 154. The band being in this position, the mechanism is now ready for the placement of a new pack of material in overlying contacting relation to the longitudinal band and the base plate 20 for effecting another wrapping operation.

It is to be understood that while I have illustrated and described one form of my invention, it is not to be limited to the specific form or arrangement of parts herein described and shown except insofar as such limitations are included in the claims.

What is claimed is:

1. An apparatus for use in banding packs of materials such as checks, currency and the like comprising:

(a) a supporting frame, (b) means rotatably mounted on said frame for holding said pack and a longitudinal band, said band having opposed end portion and a portion held by said holding means and adjacent one of the surfaces of said pack, (c) means operatively connected to said holding means for rotating said holding means about an axis generally transverse to said longitudinal band to rotate a pack held by said holding means, (d) said holding means including a pair of opposed, spaced, retaining means having a base plate for receiving the band and pack in overlying relation to said band and a pressure plate assembly in opposed relation to said base plate, said pressure plate assembly including a plate for engagement with said pack, (e) means effecting relative movement between said pressure plate and base plate for clamping engagement of said pack and said band there-between and release of said engagement upon completion of the rotation of said holding means, said means for effecting said relative movement being operable in timed sequence with said rotating means, (f) means responsibe to the pressure exerted on said pack by said plates for ceasing the relative movement between said base plate and said pressure plates when said pressure reaches a predetermined level.

(g) follower means operatively associated with said holding means for directing the band into encompassing relation about said pack as said pack is being rotated in said holding means.

2. An apparatus as recited in claim 1 wherein said pressure plate assembly includes a bipartite plate member having first and second portions and including means for moving said portions inwardly and outwardly from one another whereby said portions are positioned inwardly before clamping engagement of said pack and band between said base plate and said pressure plate assembly and wherein said portions are positioned outwardly upon release of said engagement whereby the band, when wrapped around said plate portion is freed from said plate portion, the said plate portion being slid from beneath said band.

3. An apparatus as recited in claim 1 wherein said follower means is comprised of a follower assembly including a follower tongue swingably mounted on said supporting frame and means for holding said tongue in contacting relation with said band as said holding means is rotated, whereby a band having opposed end portions with self-sealing adhesive on the end portions will have said end portions pressed into contacting sealing relation to retain the band about the pack to complete the banding operation.

4. An apparatus for use in banding packs of materials such as checks, currency and the like comprising:

(a) a supporting frame, (b) means rotatably mounted on said frame for holding said pack and a longitudinal band, said band having opposed end portions and a portion held by said holding means and adjacent one of the surfaces of said pack, (c) means operatively connected to said holding means for rotating said holding means about an axis generally transverse to said longitudinal band to rotate a pack held by said holding means, (d) said holding means including a pair of opposed spaced retaining means having a base plate for receiving the band and pack in overlying relation to said band and a pressure plate assembly in opposed relation to said base plate, said base plate and said pressure plate assembly cooperating to hold said pack and said band in clamping engagement therebetween, (e) means effecting relative movement between the base plate and pressure plate assembly for base plate assembly for effecting clamping engagement of said pack and said band therebetween and release of said engagement upon completion of the rotation of said holding means, said means for effecting said relative movement being operable in timed sequence with said rotating means, (f) said pressure plate assembly including a plate structure for engagement with said pack, (g) means responsive to the pressure exerted on said pack by said plate structure for ceasing the relative movement between said base plate and said pressure plate assembly when said pressure reaches a predetermined level, (h) said plate structure including a bipartite plate member having first and second portions, (i) means in said pressure plate assembly for moving said first and second portions of the bipartite plate member inwardly and outwardly from one another whereby said portions are positioned inwardly before clamping engagement of said pack and band between said base plate and asid pressure plate assembly and wherein said portions are positioned outwardly upon release of said engagement whereby the band, when wrapped around said plate portion is freed from said base portion, the said plate portion being slid from beneath said band, (j) follower means operatively associated with said holding means for directing the band into encompassing relation about said pack as said pack is being rotated in said holding means.

5. An apparatus for use in banding packs of materials such as checks, currency and the like comprising:

(a) a supporting frame, (b) means rotatably mounted on said frame for holding said pack and a longitudinal band, said band having opposed end portions and a portion held by said holding means and adjacent one of the surfaces of said pack, (c) means operatively connected to said holding means for rotating said holding means about an axis generally transverse to said longitudinal band to rotate a pack held by said holding means, (d) follower means operatively associated with said holding means for directing the band into encompassing relation about said pack as said pack is being rotated in said holding means, (e) means operatively associated with said holding means for feeding bands to said holding means and having a second supporting frame, (f) band housing means operatively associated with said second supporting frame for holding a supply of bands, (g) means on said frame including a mobile carriage assembly for moving a band from said housing means to said pack and band holding means, (h) means operatively connected to the band moving means for effecting said band movement in timed sequence between periodic rotations of said holding means, (i) means on said carriage assembly for engaging a single band for movement of said band to said loading means and comprised of a vacuum wheel defining a port therein for disposition in contacting relation with the band and means for drawing a vacuum through said port for retaining said band to said wheel, (j) the means operatively connected to the band moving means for effecting said band movement driving the carriage assembly to a position relative to said holding means for depositing said band in said pack and band holding means, (k) means on said carriage assembly for releasing said band from said band engaging means in a predetermined position in said holding means and including a valve means for shutting off said vacuum and a timing means for actuating said valve means in timed relation with the driving means, (l) means rotatably mounting said vacuum wheel to said carriage means whereby said wheel may be revolved in a partial rotation, (m) said vacuum wheel mounting means being a double rack assembly on said carriage assembly and a mating gear operatively connected to said wheel for engagement with said double rack assembly whereby one side of said rack may be displaced thereby rotating said gear and said wheel to effect a partial revolution of said vacuum wheel thereby lifting the end portion of said engaged band, (n) means operative after engagement of an end portion of said band with the vacuum wheel to effectively separate said band from the next lower band within said supply of bands before the driving movement of said carriage means to a position relative to said holding means, (o) means connected to said carriage assembly and operative after release of a band for moving said assembly to a position for engaging the next band in said band housing means.

6. An apparatus as recited in claim 5 including means on said carriage means for directing a jet of air toward the end carriage portion of said engaged band to blow from said band any other bands which may tend to adhere to said engaged band.

7. An apparatus as recited in claim 5 including a microswitch for effecting the timed movement of said carriage assembly to said holding means whereupon said displaced rack portion of said rack assembly engages said microswitch for activation of said driving means for movement of said carriage assembly to said pack and band holding means.

8. An apparatus for feeding bands to a band wrapping assembly or the like comprising:

(a) a supporting frame, (b) a magazine operatively associated with said frame for holding a supply of bands, (c) a mobile carriage assembly on said frame for carrying a band from said magazine to said band wrapping assembly and having means operatively connected thereto for selectively engaging and disengaging an individual band comprising a vacuum wheel defining a port therein for disposition in contacting relation with a band and means of drawing a vacuum through said port for retaining said band to said wheel wherein said means for releasing said band includes a valve means for shutting off said vacuum and a timing means for actuating said valve means in timed relation with the driving means for placing said carriage means in position for depositing said band in a pack and band holding means, (d) means rotatably mounting said vacuum wheel to said carriage means whereby said wheel may be revolved a partial rotation after engagement of an end portion of said band to effectively separate said band from the next lower band within said supply of bands before the driving movement of said carriage means to a position relative to said pack and band, (e) said vacuum wheel mounting means being a double rack assembly on said carriage element and a mating gear operatively connected to said vacuum wheel for engagement with said double rack assembly whereby one side of said rack may be displaced thereby rotating said gear and said wheel to effect a partial revolution of said vacuum wheel thereby lifting the end portion of said engaged band.

9. An apparatus as recited in claim 8 including means on said carriage means for directing a jet of air toward the end portion of said engaged band to blow from said engaged band any other bands which may tend to adhere thereto as said band is rolled back on said wheel.

10. An apparatus as recited in claim 8 including a microswitch for effecting the timed movement of said carriage assembly to said holding means whereupon said displaced rack portion of said rack assembly engages said microswitch for activation of said driving means for movement of said carriage assembly to said pack and band holding means.

11. An apparatus as recited in claim 10 wherein said band supply means is comprised of a housing, said housing including opposed spaced bottom and top walls and side walls defining an interior chamber for housing a stack of individual bands, said bottom wall having a spring means for urging said bottom wall toward said top wall whereby said stack of bands is maintained in compression between said bottom and top wall, said top wall defining an opening therein from which the uppermost band in said housing may be extracted.

12. An apparatus as recited in claim 8 including a means for wrapping said longitudinal band circumferentially about a pack of material, said wrapping means being operatively associated with said mobile carriage assembly for receiving a longitudinal band and means operatively connected to each of said carriage assembly and said band wrapping means for operating said assembly and wrapping means in timed sequence.

13. An apparatus as recited in claim 12 wherein said holding means includes a pair of the opposed, spaced, retaining plate means with one plate means of each pair being movable from a position over a pack to a spaced position and means when one of each pair is in a position over the pack for effecting relative movement between said retaining plate means for clamping engagement of said pack and said band therebetween and release of said engagement upon completion of the rotation of said hold ing means, said means for effecting said relative movement being operable in timed sequence with said rotating means.

14. An apparatus for feeding bands to a band wrapping assembly or the like comprising:

(a) a supporting frame,
(b) a magazine operatively associated with said frame for holding a supply of bands,
(c) a mobile carriage assembly on said frame for carrying a band from said magazine to said band wrapping assembly, having means operatively connected thereto for selectively engaging and disengaging an individual band,
(d) means on said frame and connected to said carriage assembly for driving said carriage assembly to and from said band wrapping assembly,
(e) means for wrapping said longitudinal bands circumferentially about a pack of material, and operatively associated with said mobile carriage assembly for receiving a longitudinal band with means operatively connected to each of said carriage assembly and said band wrapping means for operating said assembly and wrapping means in timed sequence,
(f) said band wrapping means including a second supporting frame,
(g) means rotatably mounted on said second frame for holding said pack and a longitudinal band, said band having opposed end portions and a portion held by said holding means and adjacent one of the surfaces of said pack,
(h) means operatively connected to said holding means for rotating said holding means about an axis generally transverse to said longitudinal band to rotate a pack held by said holding means,
(i) said holding means including a pair of opposed, spaced, retaining means having a base plate for receiving the band and pack in overlying relation to said band and a pressure plate assembly in opposed relation to said base plate, said pressure plate assembly including a plate for engagement with said pack,
(j) means effecting relative movement between said pressure plate and base plate for clamping engagement of said pack and said band therebetween and release of said engagement upon completion of the rotation of said holding means, said means for effecting said relative movement being operable in timed sequence with said rotating means,
(k) means responsive to the pressure exerted on said pack by said plates for ceasing the relative movement between said base plate and said pressure plates when said pressure reaches a predetermined level,
(l) follower means operatively associated with said holding means for directing the band into encompassing relation about said pack as said pack is being rotated in said holding means.

15. An apparatus as recited in claim 14 wherein said pressure plate assembly includes a bipartite plate member having first and second portions and including means for moving said portions inwardly and outwardly from one another whereby said portions are positioned inwardly before clamping engagement of said pack and band between said base plate and said pressure plate assembly and wherein said portions are positioned outwardly upon release of said engagement whereby the band, when wrapped around said plate portions is freed from said plate portions, the said plate portions being slid from beneath said band.

16. An apparatus for feeding bands to a band wrapping assembly or the like comprising:

(a) a supporting frame,
(b) a magazine operatively associated with said frame for holding a supply of bands,
(c) a mobile carriage assembly on said frame for carrying a band from said magazine to said band wrapping assembly, having means operatively connected thereto for selectively engaging and disengaging an individual band,
(d) means on said frame and connected to said carriage assembly for driving said carriage assembly to and from said band wrapping assembly,
(e) means for wrapping said longitudinal bands circumferentially about a pack of material, and operatively associated with said mobile carriage assembly for receiving a longitudinal band with means operatively connected to each of said carriage assembly and said band wrapping means for operating said assembly and wrapping means in timed sequence,
(f) said band wrapping means including a second supporting frame,
(g) means rotatably mounted on said second frame for holding said pack and a longitudinal band, said band having opposed end portions and a portion held by said holding means and adjacent one of the surfaces of said pack,
(h) means operatively connected to said holding means for rotating said holding means about an axis generally transverse to said longitudinal band to rotate a pack held by said holding means,
(i) follower means operatively associated with said holding means for directing the band into encompassing relation about said pack as said pack is being rotated in said holding means,
(j) said means for rotating said holding means including stop means for stopping said rotation at a predetermined position,
(k) said rotatably mounted holding means including a member rotatable about the axis of rotation of said holding means in connection thereto with said rotatable member defining an abutment surface thereon, (l) said stop means including a spring biased stop member engageable with said abutment surface to stop the rotation of said holding means and means connected to said stop member for withdrawing said stop member from engagement with said abutment surface when said holding means is to commence rotation, said means for withdrawing the stop member including means for effecting said withdrawal in timed sequence with said rotating means.

17. An apparatus for use in banding packs of materials such as checks, currency and the like comprising:

(a) a supporting frame, (b) means rotatably mounted on said frame for holding a pack and a longitudinal band, said band having opposed end portions and a portion held by said holding means and adjacent one of the surfaces of said pack, (c) means operatively connected to said holding means for rotating said holding means about an axis generally transverse to said longitudinal band to rotate a pack held by said holding means, (d) follower means operatively associated with said holding means for directing the band into encompassing relation about said pack as said pack is being rotated in said holding means, (e) said holding means including a base plate and a pair of horizontally opposed spaced pressure plates in vertically opposed spaced relation to said base plate, (f) a pair of double rack and gear assemblies on opposed sides of said base plate and said pressure plate assemblies each having a pair of rack members, one of said rack members being secured to said base plate and the other of said rack members connected to one of the pressure plate assemblies, (g) means operatively connected to each of said rack and gear assemblies for driving said assemblies for moving said base plate and said pressure plate assemblies inwardly and outwardly of one another for clamping engagement of said material pack and band therebetween.

18. An apparatus as recited in claim 17 wherein said pressure plate assemblies each include a frame member, a pressure plate slidably connected to said frame member, and means for sliding said pressure plate whereby said plates of said opposed assemblies may be selectively moved horizontally inwardly and outwardly of one another in timed sequence with the driving means for moving said assemblies and base plate inwardly and outwardly of one another.

19. An apparatus for use in banding packs of materials comprising:

a supporting frame, means rotatably mounted on said frame for holding said pack and an elongate strip of banding material, said strip having a portion held by said holding means in a position adjacent one of the surfaces of said pack, means operatively connected to said holding means for rotating said holding means about an axis generally transverse to said strip thereby to rotate a pack held by said holding means, said holding means including a base plate and a pair of horizontally opposed, spaced pressure plates in normally vertically opposed spaced relationship to said base plate, a pair of double rack and gear assemblies on opposed sides of said base plate and said pressure plate assemblies, each having a pair of rack members, one of said rack members being secured to said base plate and the other of said rack members connected to one of the pressure plate assemblies, and means operatively connected to each of said rack and gear assemblies for driving said assemblies for moving said base plate and said pressure plate assemblies toward and away from one another for clamping engagement of said material pack and strip therebetween.

20. An apparatus as recited in claim 19 wherein said pressure plate assemblies each include a frame member, a pressure plate slidably connected to said frame member, and means for sliding said pressure plate to and fro, whereby said plates of said opposed assemblies may be selectively moved horizontally inwardly and outwardly of one another in timed sequence with the driving means for moving said assemblies and base plate toward and away from one another.

21. An apparatus for feeding banding material to a band wrapping assembly or the like comprising:

a supporting frame, means operatively associated with said frame for supplying banding material, a mobile carriage assembly on said frame for carrying banding material in strip form to said band wrapping assembly, means on said frame and connected to said carriage assembly for driving said carriage assembly to and from said band wrapping assembly, means for wrapping said banding strip circumferentially about a pack of material, and operatively associated with said mobile carriage assembly for receiving a length of banding strip with means operatively connected to each of said carriage assembly and said band wrapping means for operating said assembly and wrapping means in timed sequence, said band wrapping means including a second supporting frame, means rotatably mounted on said second frame for holding said pack and a length of banding material, said band having a portion held by said holding means adjacent one of the surfaces of said pack, means operatively connected to said holding means for rotating said holding means about an axis generally transverse to said band length to rotate a pack held by said holding means, said means for rotating said holding means including stop means for stopping said rotation at a predetermined position, said rotatable holding means including a member rotatable about the axis of rotation of said holding member in connection thereto with said rotatable member defining an abutment surface thereon, said stop means including a spring biased stop member engageable with said abutment surface to stop the rotation with said means, and means connected to said stop member for withdrawing said stop member from engagement with said abutment surface when said holding means is to commence rotation, said means for withdrawing the stop member including means effecting said withdrawal in timed sequence with said rotating means.

22. An apparatus for feeding banding material to a band wrapping assembly and wrapping said material around a pack of checks or like material, comprising:

a supporting frame, means operatively associated with said frame for holding a supply of banding material, a mobile carriage assembly on said frame for carrying a strip of banding material to said band wrapping assembly, means on said frame and connected to said carriage assembly for driving said carriage assembly to and from said band wrapping assembly, means for wrapping said strip circumferentially about a pack of material, and operatively associated with said mobile carriage assembly for receiving said strip with means operatively connected to each of said carriage assembly and said band wrapping means for operating said assembly and wrapping means in timed sequence, said band wrapping means including a second supporting frame, means rotatably mounted on said second frame for holding said pack and said strip, said strip having a portion held by said holding means adjacent one of the surfaces of said pack, means operatively connected to said holding means for rotating said holding means about an axis generally transverse to said strip to rotate a pack held by said holding means, said holding means including a pair of opposed, spaced, retaining means having a base plate for receiving the strip and the pack in overlying relationship to said strip, and a pressure plate assembly in opposed relationship to said base plate, said pressure plate assembly including a plate for engagement with said pack, means effecting relative movement between said pressure plate and base plate for clamping engagement of said pack and said strip therebetween and release of said engagement upon completion of the rotation of said holding means, said means for effecting said relative movement being operable in timed sequence with said rotating means, means responsive to the pressure exerted on said pack by said plates for ceasing the relative movement between said base plate and said pressure plates when said pressure reaches a predetermined level.

23. An apparatus as recited in claim 22 wherein said pressure plate assembly includes a bipartite plate member having first and second portions, and including means for moving said portions inwardly and outwardly from one another, whereby said portions are positioned inwardly before clamping engagement of said pack and strip between said base plate and said pressure plate assembly, and wherein said portions are positioned outwardly upon release of said engagement, whereby the band, when wrapped around said plate portions, is freed from said plate portions, the said plate portions being slid from beneath said band.

24. An apparatus for use in banding packs of materials comprising:

a supporting frame, means rotatably mounted on said frame for holding said pack and a strip of banding material, said strip having a portion held by said holding means adjacent one of the surfaces of said pack, means operatively connected to said holding means for rotating said holding means about an axis generally transverse to said strip to rotate a pack held by said holding means, said holding means including a pair of opposed spaced retaining means having a base plate for receiving the strip and pack in overlying relationship to said strip and a pressure plate assembly in opposed relationship to said plate, said base plate and said pressure plate assembly cooperating to hold said pack and strip in clamping engagement therebetween, means effecting relative movement between the base plate and pressure plate assembly for effecting clamping engagement of said pack and strip therebetween and release of said engagement upon completion of the rotation of said holding means, said means for effecting said relative movement being operable in timed sequence with said rotating means, said pressure plate assembly including a plate structure for engagement with said pack, means responsive to the pressure exerted on said pack by said plate structure for ceasing the relative movement between said base plate and said pressure plate assembly when said pressure reaches a predetermined level, said plate structure including a bipartite plate member having first and second portions, and means in said pressure plate assembly for moving said first and second portions of the bipartite plate member inwardly and outwardly from one another, whereby said portions are, first, positioned inwardly before clamping engagement of said pack and strip between said base plate and said pressure plate assembly and wherein said portions are, secondly, positioned outwardly upon release of said engagement, whereby the strip, when wrapped around said plate portion is freed from said base portion, the said plate portion being slid from beneath said strip.

25. An apparatus for use in banding packs of materials such as checks, currency and the like comprising:

a supporting frame, means rotatably mounted on said frame for holding said pack and a strip of banding material, said strip having a portion held by said holding means adjacent one of the surfaces of said pack, means operatively connected to said holding means for rotating said holding means about an axis generally transverse to said strip to rotate a pack held by said holding means, said holding means including a pair of opposed, spaced, retaining means having a base plate for receiving the strip and pack in overlying relation to said strip and a pressure plate assembly in opposed relationship to said base plate, said pressure plate assembly including a plate for engagement with said pack, means effecting relative movement between said pressure plate and base plate for clamping engagement of said pack and said strip therebetween and release of said engagement upon completion of the rotation of said holding means, said means for effecting said relative movement being operable in timed sequence with said rotating means, and means responsive to the pressure exerted on said pack by said plates for ceasing the relative movement between said base plate and said pressure plates when said pressure reaches a predetermined level.

26. An apparatus as recited in claim 25 wherein said pressure plate assembly includes a bipartite plate member having first and second portions and including means for moving said portions inwardly and outwardly from one another, whereby said portions are first positioned inwardly before clamping engagement of said pack and strip between said base plate and pressure plate assembly, and wherein said portions are secondly positioned outwardly upon release of said engagement, whereby the strip, when wrapped around said plate portion, is freed from said plate portion, the said plate portion being slid from beneath said strip.

27. A process of banding stacked materials, comprising:

laying a strip of banding material on a base plate, laying a stack of the materials to be banded on said base plate over a portion of the strip of banding material, gripping the other side of the stack from said plate and strip with a pair of pressure plates whereby to compress the stack against the base plate and band portion, rotating the gripped assembly of base plate, band material portion, stack and pressure plates whereby to wrap the banding material around the stack and pressure plates, adhering one portion of the band to another to effect a circular band around the stack and portions of the pressure plates, and thereafter withdrawing the pressure plates from under said band and releasing pressure therefrom on the stack whereby to permit removal of the banded stack from the base plate.

28. A process of banding stacked materials, comprising:

laying a portion of a strip of banding material on a base plate, laying a stack of the materials to be banded on said base plate over said portion of the strip of banding material, gripping the other side of the stack with a pair of pressure plates thereby to compress the stack against the base plate and band portion, wrapping an additional portion of said strip of banding material around the gripped assembly of base plate, band material portion, stack and pressure plates, adhering one portion of the band to another to effect a complete circular band therearound including a portion of each of said plates, and retracting said plates from under said band and releasing pressure thereon thereby to free the banded stack for removal from said base plate.

References Cited

UNITED STATES PATENTS

| | | | |
|---|---|---|---|
| 1,123,606 | 1/1915 | Smith | 53—198X |
| 2,714,006 | 7/1955 | Layden | 271—28 |
| 2,723,849 | 11/1955 | Luhn | 271—54X |

THERON E. CONDON, Primary Examiner

E. F. DESMOND, Assistant Examiner

U.S. Cl. X.R.

53—24, 124, 198